(12) United States Patent
Werner

(10) Patent No.: US 10,829,320 B2
(45) Date of Patent: Nov. 10, 2020

(54) CONVEYOR SYSTEM FOR THE CONVEYING OF GOODS ITEMS

(71) Applicant: BEUMER Group GmbH & Co. KG, Beckum (DE)

(72) Inventor: Andreas Werner, Dortmund (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 16/521,964

(22) Filed: Jul. 25, 2019

(65) Prior Publication Data
US 2020/0048019 A1 Feb. 13, 2020

(30) Foreign Application Priority Data

Aug. 9, 2018 (EP) ..................................... 18188159

(51) Int. Cl.
*B65G 67/32* (2006.01)
*B65D 1/34* (2006.01)
*B65G 17/00* (2006.01)
*B65G 35/06* (2006.01)

(52) U.S. Cl.
CPC ............... *B65G 67/32* (2013.01); *B65D 1/34* (2013.01); *B65G 17/002* (2013.01); *B65G 35/06* (2013.01); *B65G 2814/0358* (2013.01)

(58) Field of Classification Search
None
See application file for complete search history.

(56) References Cited

U.S. PATENT DOCUMENTS

| 6,540,064 | B1 * | 4/2003 | Bodewes | B61B 13/00 198/346.1 |
| 7,318,519 | B2 * | 1/2008 | Sorensen | B65D 1/34 198/349 |
| 10,399,790 | B2 * | 9/2019 | Heitplatz | B65G 65/00 |
| 2005/0006209 | A1 * | 1/2005 | Sorensen | B65D 1/34 198/867.11 |
| 2018/0265303 | A1 | 9/2018 | Heitplatz et al. | |
| 2019/0127147 | A1 * | 5/2019 | Wagner | B65G 65/005 |

FOREIGN PATENT DOCUMENTS

DE 60206062 6/2006
EP 456297 A2 * 11/1991

* cited by examiner

*Primary Examiner* — William R Harp
(74) *Attorney, Agent, or Firm* — Ganz Pollard, LLC

(57) ABSTRACT

Conveyor system for the conveying of goods items, with at least one transport container for accommodating a goods item and a controlled, drivable and movable, driverless transport unit for accommodating and conveying a transport container; where the transport unit comprises a discharge device for unloading a goods item, situated on the accommodated transport container, from the transport container and a retaining mechanism for establishing a detachable connection between the transport container and the transport unit, by means of which the transport container is to be held on the transport unit.

21 Claims, 11 Drawing Sheets

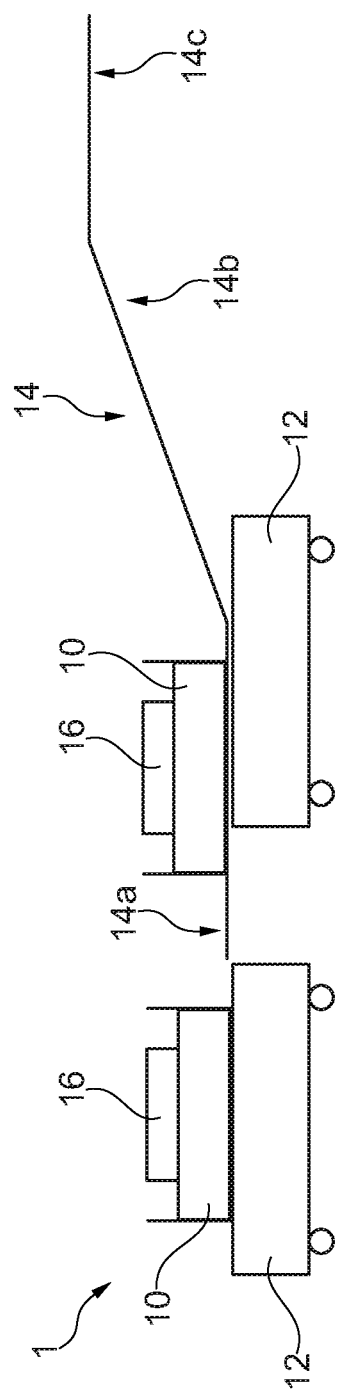

CONVEYOR SYSTEM FOR THE CONVEYING OF GOODS ITEMS

BACKGROUND

The present invention relates to a conveyor system for the conveying and/or sorting of goods items.

Conventional conveying and sorting systems make possible the conveying of goods items on track-bound or freely controllable carriages. From DE 602 06062 T2 a conveyor system is known, in which transport containers are employed for the conveying and sorting of goods items.

The transport containers may in that case be detachably connected to carriages for the purpose of being conveyed by these. The transport containers may be X-ray permeable, for use at airports, for example, so that the contents of the transport containers are identifiable by X-ray equipment.

The problem posed for the present invention is to ensure that the handling of transport containers and goods items is as flexible as possible.

SUMMARY

According to the invention, this problem is solved by a conveyor system having at least one transport container for the accommodation of a goods item and a controlled, drivable and movable, driverless transport unit for the accommodation and conveying of a transport container, where the transport unit comprises: a discharge device for unloading from the transport container a goods item situated on the accommodated transport container; and a retaining mechanism for establishing a detachable connection between the transport container and the transport unit, by means of which the transport container is to be retained on the transport unit. The discharge device may also be designed for discharge of the transport container from the transport unit. The detachable connection can be controlled in order to selectively activate the retaining mechanism to connect the transport container with the transport unit and retain the transport container on the transport container, or to release the retaining mechanism and allow the transport container to be discharged from the transport unit. The transport unit may comprise a control unit incorporating this functionality.

The discharge device may comprise a tipping device for tipping an accommodated transport container in order to unload goods items from the transport container, in which case the retaining mechanism is designed to retain the transport container on the transport unit during a tipping-unloading process. The tipping device may have a tipping axis oriented in the direction of travel, that is to say an accommodated goods item is discharged to the side, at right angles to the direction of travel. A tipping-discharge process is also possible, in which an empty transport container, or one laden with a goods item, is discharged. In that case the retaining mechanism is controlled in such a way that the connection between transport unit and transport container is detached.

The transport unit may be track-bound, that is to say the transport unit does not travel on physically formed guide rails, but is optically controlled, for example, or controlled by induction loops. Furthermore, the transport unit may be completely independent of predefined routes or track sections, perhaps with the aid of a control unit which has camera and/or sensor systems at its disposal.

The controlled, drivable and movable, driverless transport units generate a high level of flexibility of the conveyor system. In particular, new or modified processes can be rapidly implemented. And if the basic parameters of the conveyor system change, the changes can simply be entered into the transport unit control or running programs. Accordingly, the locations at which the transport units pick up or discharge goods items and/or transport containers can be varied, as can the transport unit routes.

The advantages of the present invention may in particular be fully realised in a conveyor system with a plurality of transport units. In such cases, one transport unit may accommodate one or more transport containers. Each transport container may in turn accommodate one or more goods items. On unloading or discharge of the transport container, the transport container can be tipped by means of the discharge device. The tipping device may comprise an integral hinge or similarly acting functional unit on the transport unit and on the transport container for the purpose of tipping the latter. Alternatively, the tipping device may be a unilateral lifting element for the transport container. If the tipping device consists of a unilateral lifting element, the retaining mechanism may perform a hinge function between transport container and transport unit. In this case, the retaining means of the transport unit and the retaining means of the transport container together form a hinge, so that the transport container is pivoted when the lifting element of the tipping device lifts the transport container on one side.

The transport unit may be controlled by a control unit which is formed as part of the transport unit or as an external master control unit. An external control unit may control a plurality of transport units simultaneously. Preferably, the transport unit drive forms an integral part of the transport unit, that is to say each transport unit preferably possesses its own drive. The drive may consist of an electric motor, an internal combustion engine or similar. A battery may serve as energy store for the drive. Alternatively, or additionally, electric sensors may be employed to establish contact with a conductor along the route of travel, or inductive energy transmission may be provided.

The conveyor system may comprise a conveyor with a transfer point, at which a transport container can be transferred from a driverless transport unit to the conveyor or vice-versa.

The conveyor may also comprise a track system, on which a transport container can be conveyed.

The conveyor may comprise a conveyor belt for the conveying of a transport container.

At a transfer point a transfer device may be provided, which takes the form of a slide or ramp, from which or onto which a transport container can be slid up or down, or rolled, onto a transport unit or onto the conveyor. Alternatively, a transfer device may be provided which grabs a transport container from the conveyor or transport unit, lifts it, moves it over the transport unit or conveyor and places it on this.

The combination of a conveyor with a conveyor system offers the advantage of being able to convey goods items particularly efficiently in specific circumstances. On particularly demanding or long route sections, a conveyor may for example be provided, the course of which may be fixed, for example track-bound. Such highly frequently used route sections may for example include the goods inward or goods outward area of a warehouse, a sorting plant or a production plant. Simple and automatable transfer between transport units and conveyor makes for a rapid and efficient transfer between the individual and flexible transport units and the efficient conveyor. After transfer of individual transport containers from the conveyor to transport units, they may then be flexibly dispatched to a plurality of sorting destinations.

In one embodiment, the transport container may have a coupling section with a first retaining means and the retaining mechanism a second retaining means for interaction with the first retaining means. In this way, relative movement between the driverless transport unit and the transport container may be reduced to a predetermined level, and in particular the transport container may be fixed to the transport unit, so that, whenever it is tipped, it does not become detached from the transport unit, unless so desired, in which case the retaining mechanism is detached for that purpose.

The first retaining means may be designed to engage interlockingly with the second retaining means.

The first retaining means may consist of projections and the second retaining means may consist of recesses corresponding to the projections, or vice-versa.

If the transport containers are transferred from the conveyor to the transport unit, the transport containers may be placed onto the upper side of the transport unit from above. The transport containers may have the first retaining means on their underside, and on placing onto the transport unit these then engage with the second retaining means on the transport unit. The second retaining means are preferably arranged on the upper side of the transport unit. Preferably, the upper side of the transport unit, on which the second retaining means are arranged, is a flat mating surface. It is also preferred that the underside of the transport containers, on which the first retaining means are arranged, should be a corresponding flat mating surface. The flat upper side of the transport unit and the flat underside of the transport container may together form a contact plane, which is preferably parallel to a floor level on which the transport unit travels. The first and second retaining means are able to prevent slipping or displacement of the transport containers on the transport units parallel to the contact plane. Depending on the amount of clearance between the first and second retaining means, relative movement of the transport container parallel to the contact plane can be reduced to a specific level. Preferably, positive/projecting retaining means are designed in such a way that they taper towards the end, while corresponding negative retaining means/recesses widen at the outer edges. In this way, simplified, self-centering location and automatic centering between the transport container and the transport unit can be effected. Retaining means without, or almost without, any clearance can be provided.

The retaining mechanism may comprise detachable clamping or tensioning elements for interaction with a transport container, allowing fixing of the transport container to a transport unit.

Clamping or tensioning elements may be provided, which are attached to the transport unit and interact with corresponding counter elements on the transport containers. In this way an additional interlocking or force-fit connection can be established between the transport unit and the transport container. In addition to protecting the transport container against horizontal displacement parallel to the floor level/contact plane, these elements may provide protection against vertical displacement at right angles to the floor level/contact plane. In particular, the transport container may in this way be secured during tipping onto the transport unit.

The transport container may further comprise an accommodation section, which defines an upper object-bearing surface for goods items. The accommodation section and the coupling section may together form a hollow body.

In specified applications it may be necessary to check the contents of goods items or the contents of the transport container by means of X-radiation. This is in particular necessary at airports, railways stations or similar locations with high security requirements. The transport container, in particular the accommodation section and the coupling section, may for this purpose be X-ray permeable.

The transport containers may comprise first, or small, transport containers with a first length (L1) and a first width (B1) which is smaller than the first length (L1), at least two of which may at any one time be accommodated next to each other on the transport unit by means of the retaining mechanism, with their length at right angles to a direction of conveying.

The transport containers may comprise second, or large, transport containers with a second length (L2) and a second width (B2) which is smaller than the second length (L2). The second length (L2) may in this case be greater than the first length (L1) and the second width (B2) greater than the first width (B1). These second, or large, transport containers may in each case be accommodated on the transport unit by means of the retaining mechanism, with their length in the direction of conveying. The second retaining means may in this connection be designed for interaction either with the first retaining means of one or more small transport containers accommodated at right angles to the direction of conveying or with the first retaining means of one large transport container accommodated in the direction of conveying, and for restriction of movement of a transport container in, or at right angles to, the direction of conveying relative to an accommodating surface of the transport unit to a predetermined level.

With a view to increased flexibility, it may prove particularly beneficial for the retaining mechanism of the transport unit to be designed in such a way that transport containers can be accommodated both in length direction and in a direction at right angles to the direction of travel or conveying of the transport unit. For this, the retaining means on the transport containers and transport units may exhibit the same modular spacing in both longitudinal and transverse directions. If the transport containers are narrower in width than they are long, the side lengths of a base area of the transport container will thus be of differing length, and so more transport containers can then be arranged in transverse direction on a transport unit than in length direction. Accordingly, a single transport container may for example be arranged in longitudinal direction, or alternatively two transport containers may be arranged in transverse direction, on a transport unit.

The transport unit may have steerable rollers or wheels which are pivotable through up to 90° or more, in order to ensure a turning circle diameter which is as small as possible, thus allowing for turning on the spot.

The upper object-bearing surface may be concave upward in cross-section, thus forming a hollow for accommodation of the goods item(s). This upper object-bearing surface may exhibit a curvature exclusively at right angles to the length direction or direction of travel, or a curvature in length direction only, or both.

A conveyor system according to the invention is preferably to be employed in accordance with a procedure as described below. This procedure comprises at least the following steps:

1) Loading of transport container with a goods item;
2) Picking up of loaded transport container by a transport unit and connection of the transport unit to the transport container by means of the retaining mechanism;

3) Conveying of the loaded transport container by the transport unit;
4) Unloading of the goods item by means of the discharge device or by detaching the connection between the transport container and the transport unit by means of the retaining mechanism and then discharge of the transport container loaded with the goods item.

The procedure may further comprise the following steps:
1.1) Transfer of the loaded transport container to a conveyor;
1.2) Conveying of the loaded transport container on the conveyor;
1.3) Transfer of the loaded transport container from the conveyor to a transport unit.

The procedure may in addition comprise the following step:
4.1) Detachment of the connection between the transport container and the transport unit by means of the retaining mechanism and transfer of the loaded transport container from the transport unit to the conveyor.

The following step may further be included:
Taking over of an empty transport container, or of a transport container loaded with a goods item, from the conveyor by a transport unit, or transfer in reverse direction.

Preferably, the step of unloading the goods item is performed while the transport container is connected to the transport unit, so that the goods item is tipped out during travel, for example at an unloading station or at an end point of a sorting plant.

Loading of the transport container may occur with at least one goods item being tipped into a transport container, falling from a conveyor into the transport container or being placed in the container by operatives or robots. The transport containers may be loaded while they are situated on a transport unit or on the conveyor. Alternatively, the transport containers may be loaded at another location, for example at a separate loading station.

When the transport container is picked up by the transport unit, the transport container may be placed onto the transport unit from above. In that case the first and second retaining means engage with each other in order to secure or attach the transport container in horizontal direction to the transport unit. Alternatively, or additionally, tensioning or clamping elements may be employed, which secure the transport container in vertical direction relative to the transport unit. The tensioning or clamping elements are able to generate a mutually directed retaining force between the transport container and the transport unit.

The transport unit may be assigned a predetermined destination or route by an external control unit. Alternatively, routes which are to be travelled may be stored in an internal memory on the transport unit. The transport unit may recognise obstacles, critical points, reference points, loading and unloading stations or similar, for example by means of a camera or other sensors, and if necessary, perform evasive manoeuvres, braking or specific travel sequences or processes. Evaluation of camera or sensor data may be carried out in a central control unit or on board the transport unit in an internal transport unit control or regulation system.

Unloading of the transport container may occur with goods items being tipped out of the transport container or with operatives or machines taking them out. The transport container may be unloaded while it is situated on a transport unit or on a conveyor. Alternatively, the transport container may be unloaded in a different location, for example at a separate unloading station.

The transport container may be loaded with a load, for example goods items, and conveyed by means of the conveyor, for example a conveyor belt. The loaded transport container may be driven on or transferred to a driverless transport unit. The transport container may be connected to the driverless transport unit in order to ensure secure transportation. The driverless transport unit may travel automatically to a pre-set destination. The destination may for example be an unloading station for the load/goods items and/or for the transport container. When unloading, the driverless transport unit may drive past the unloading station and tip off a goods item as it passes the unloading station or else travel beneath a conveyor transfer point, in which case the transport container is transferred to the conveyor either automatically or by being controlled by the driverless transport unit. In this situation, a load may lie on the transport container and be conveyed together with the transport container on the conveyor.

All the above-mentioned procedural steps may be performed any number of times and in any sequence. In many applications, the goods items are conveyed either from a few central pick-up points to multiple different discharge points/unloading stations or vice-versa.

Thus, the transport containers may for example be conveyed in loaded condition by means of one or more conveyors to transfer points and from there distributed to transport units, which discharge the transport containers at discharge points/unloading stations or tip the goods items from the transport containers at discharge points/unloading stations. This comes into question for example in the distribution of goods items in a warehouse or factory.

On delivery of goods items from a warehouse, the process may occur in reverse direction. Thus, the transport unit may for example travel with at least one unladen transport container, or without a transport container, to one of a plurality of feed points, where the transport unit can pick up at least one transport container with at least one goods item, or the at least one transport container with at least one goods item can be loaded onto the transport unit. The transport unit may then convey the at least one transport container to a conveyor belt or to one selected from a few conveyor belts, in order to further convey the at least one transport container or the at least one goods item.

BRIEF DESCRIPTION OF THE DRAWINGS

The invention will now be described on the basis of various embodiments with reference to a Drawing.

FIG. 4 shows a conveyor system according to the invention during transfer of a transport container from a transport unit to a conveyor.

DETAILED DESCRIPTION

Figure 1:
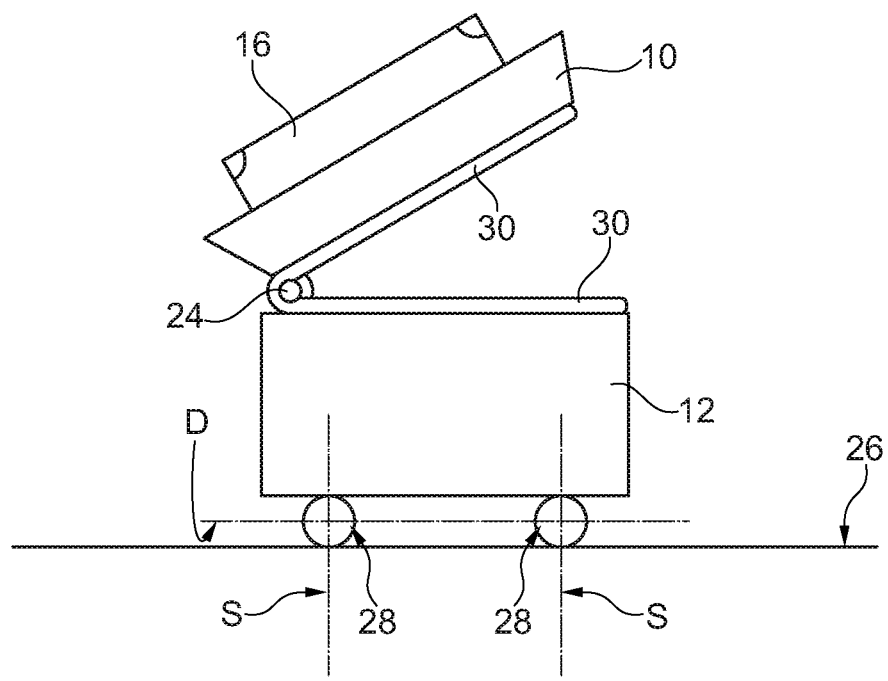
FIG. 1 shows a transport unit with a transport container.

FIG. 1 illustrates a first embodiment of a transport unit 12. The transport unit 12 possesses wheels or rollers 28, two of which can be seen in the Figure. The transport unit also possesses a discharge device 30 with a hinge 24. A transport container 10 is detachably fixed to the discharge device 30 of the transport unit 12. On a bearing surface (not visible) of the transport container 10 lies a goods item 16. In the embodiment illustrated here, the discharge device 30 is designed as a tipping device. In the operational state represented here, the transport container 10 is in tipped condition, in which the goods item 16 slides from the bearing surface of the transport container 10. To achieve this, the upper leg of the tipping device 30 has been pivoted upwards about the hinge 24 from a starting position which is approximately parallel to an illustrated floor level 26, so that the goods item 16 is able to slide from the transport container 10. The transport container 10 is in this case detachably retained on the transport unit 12 by a retaining mechanism (not shown in FIG. 1).

The wheels 28 are pivotally mounted about a rolling axis D, so that the transport unit can travel in at least one direction. When the transport unit 12 is travelling in a straight line, preferably two wheels or rollers 28 each lie on a rolling axis D and at least one of the wheels or rollers is drivable. By preference, at least two wheels are drivable. At the same time, two wheels are steerable about an axis of rotation S, in order to facilitate travel of the transport unit around curves.

Figure 2:
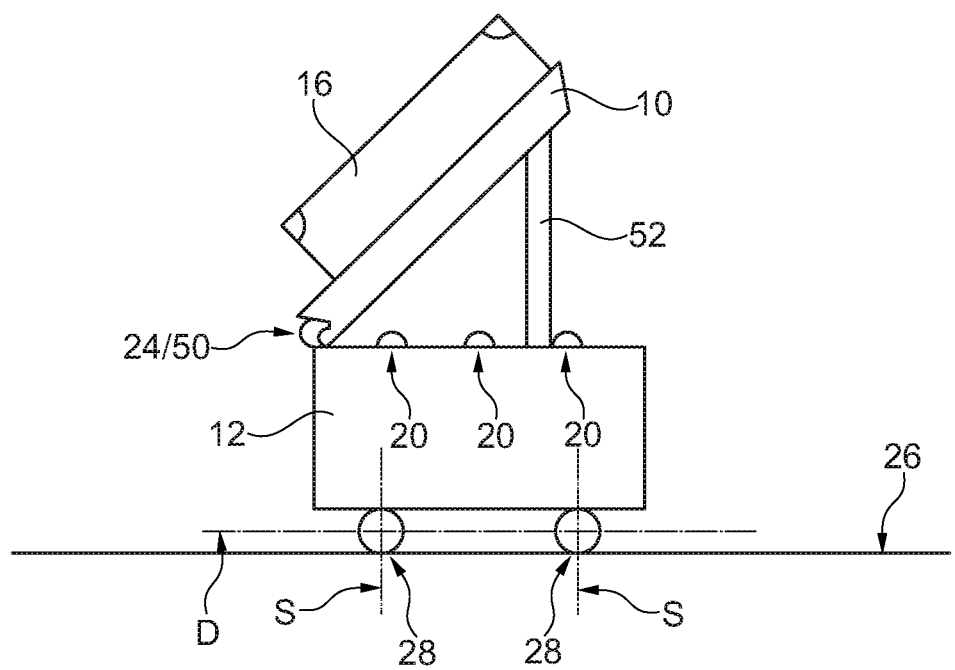
FIG. 2 shows a further embodiment of the transport unit.

FIG. 2 shows a further possible embodiment of a transport unit 12. In the embodiment illustrated here, the tipping device has a lifting element 52 on one side, which pushes the transport container 10 upwards at one end, so that the transport container is pivoted about a hinge 24, which is formed by means of the retaining mechanism 50 on the opposite end of the transport container 10. In the case illustrated, second retaining means 20 are identifiable on the upper side of the travel unit 12. The second retaining means 20 also form part of the retaining mechanism 50 and engage with first retaining means 18 on the underside of the transport container 10, which are not however shown in FIG. 2.

Figure 3A:
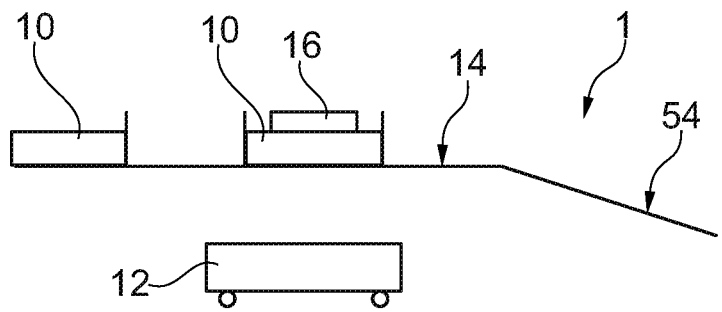
FIG. 3A shows a conveyor system according to the invention at a first point in time.
Figure 3B:
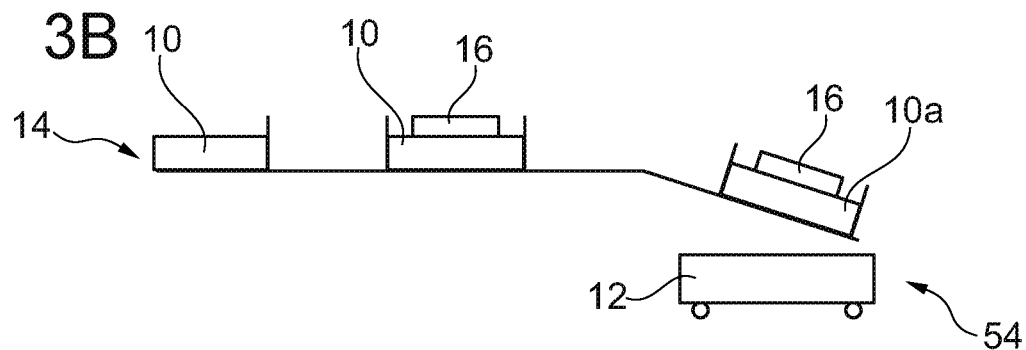
FIG. 3B shows the conveyor system from FIG. 3A at a second point in time.
Figure 3C:
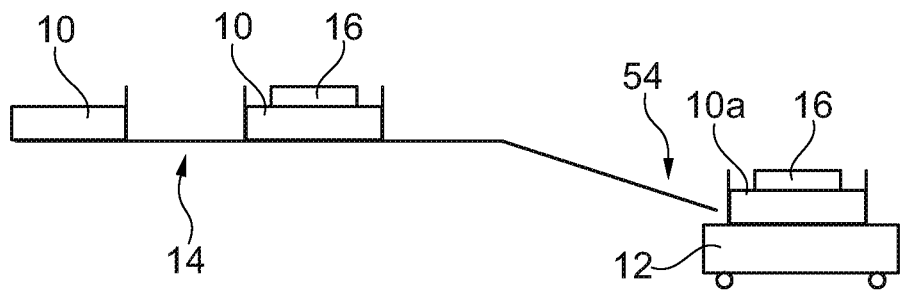
FIG. 3C shows the conveyor system from FIG. 3A at a third point in time.

FIGS. 3A to 3C show a conveyor system 1 according to the invention in three different operating states. In the operating state illustrated in FIG. 3A, two transport containers 10 are situated on a conveyor 14 and are being conveyed in the direction of a transfer point 54. On the front transport container is situated a goods item 16 which is to be conveyed. At the same time, a transport unit 12 travels in the direction of the transfer point 54, in order to pick up the transport container 10 with the goods item 16.

FIG. 3B illustrates how the transport container 10a slides down a ramp of the conveyor 14 to the transfer point 54, in order to be transferred there to the transport unit 12. Behind the transport container 10a are situated two further transport containers 10 on a horizontal section of the conveyor 14, two of the transport containers 10, 10a each conveying a goods item 16.

FIG. 3C shows the conveyor system 1 in a state in which the transport container 10a together with goods item 16 has just been transferred at the transfer point 54 from the conveyor 14 to the transport unit 12 and is being conveyed further by the transport unit 12. On the conveyor 14 are situated, as before, two transport containers 10 each with a goods item 16.

FIG. 4 shows how the procedure can be performed in reverse direction. In this case, a transport container 10 with a goods item 16 is transferred from a transport unit 12 to a conveyor 14.

In the example illustrated, the transport unit 12 travels beneath the—in this case horizontal—transfer point 14a of the conveyor 14. Tracks, a conveyor belt or roller elements of the conveyor 14 then engage at least in part with the underside of the transport container 10 carrying the goods item 16.

Not later than the beginning of the ramp incline 14b of the conveyor 14, the transport container 10 is lifted from the transport unit 12 and the conveyor 14 takes over the transport container 10 and its conveying.

After the transport container 10 has reached a sufficient height above the transport containers 12, the conveyor 14 once more runs in horizontal direction, corresponding to the horizontal section 14c.

Figure 5:
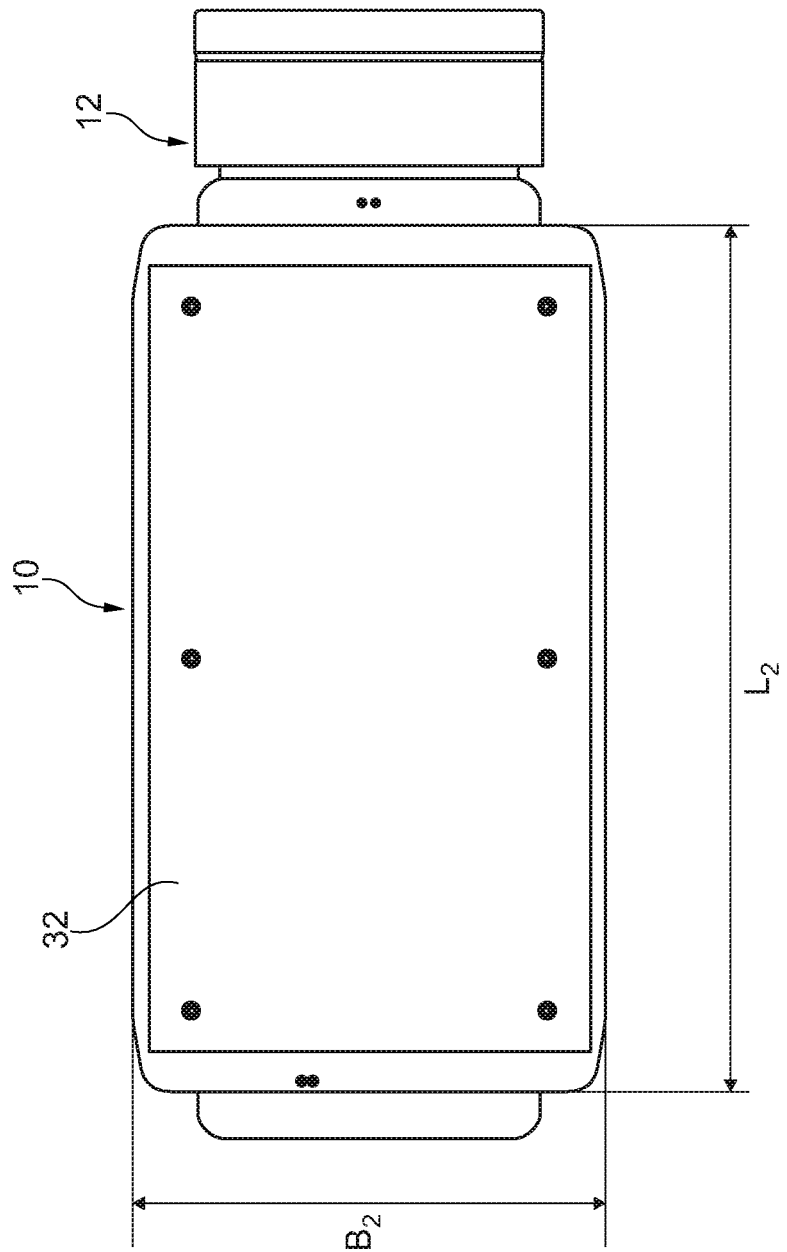
FIG. 5 shows a transport unit in a first operating state.

FIG. 5 shows a transport unit 12, on which a transport container 10 without goods item is arranged. The transport container 10 is here disposed in longitudinal direction parallel to a direction of travel of the transport unit 12, that is to say, the longest side edges of the transport container run parallel to the direction of travel of the transport unit 12. The perspective illustrated shows a top view of the transport unit 12 and the transport container 10, so that a bearing surface 32, formed by a hollow, is identifiable. On this bearing surface 32, or in the corresponding hollow, goods items 16 can be conveyed.

Figure 6:
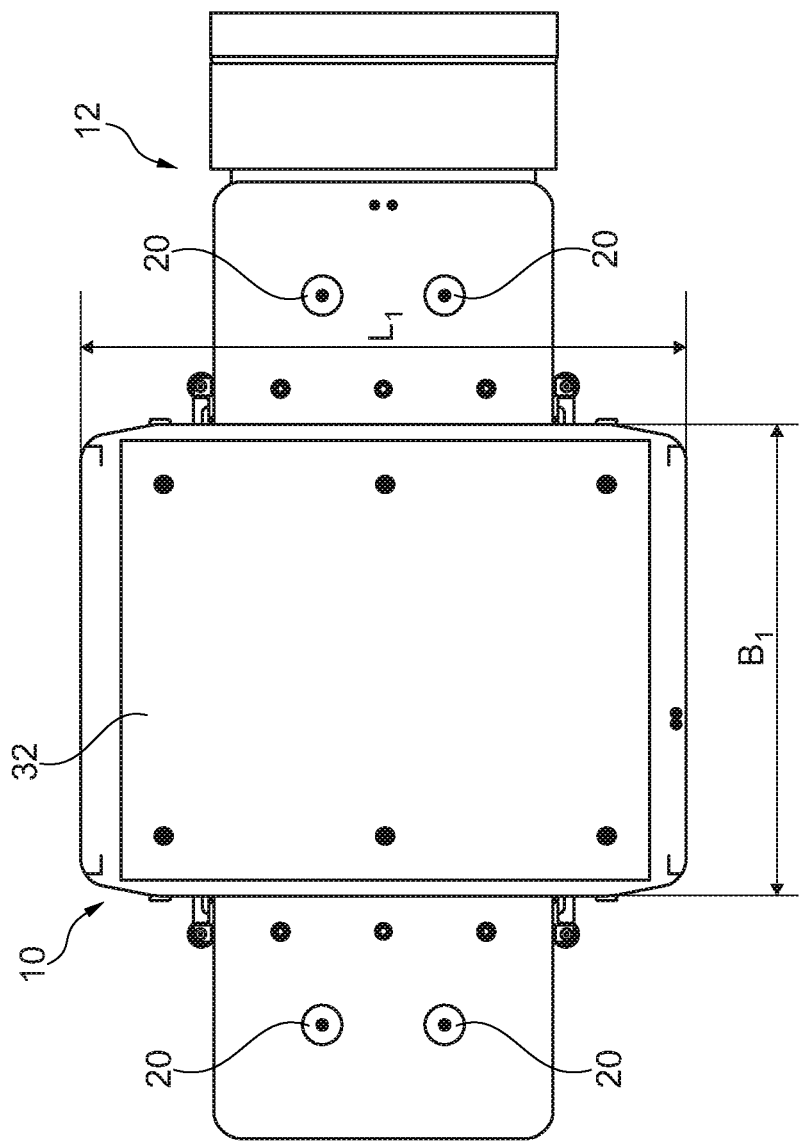
FIG. 6 shows the transport unit from FIG. 5 in a second operating state.

FIG. 6 likewise presents a top view of a transport unit 12 with a transport container 10, which in this case, however, is accommodated not lengthwise but crosswise, or in other words the transport container 10 is arranged on the transport unit 12 having been rotated through an angle of around 90°. Since the transport container 10 is located in the middle of the transport unit 12, two projections of the second retaining means 20 are respectively identifiable in front of and behind the transport container 10. Four further projections of the retaining means 20 are situated beneath the transport container 10 and engage with the first retaining means 18 of the transport container 10.

Figure 7:
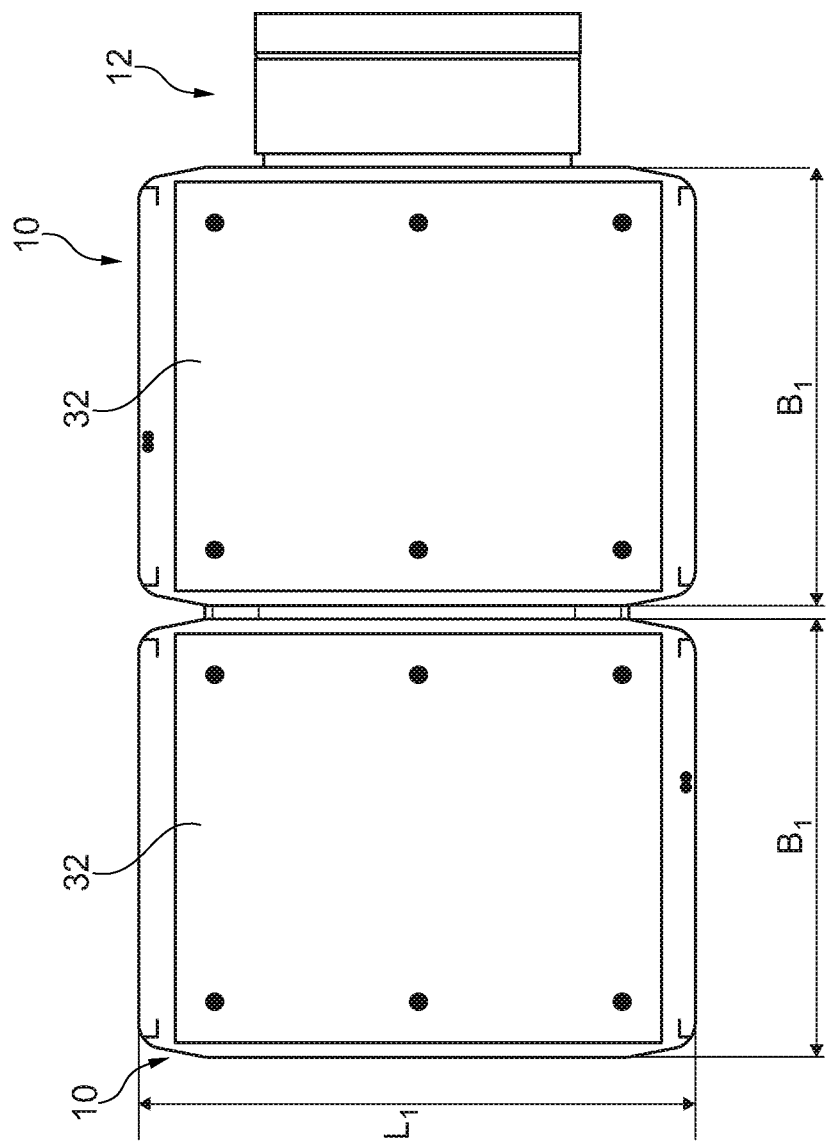
FIG. 7 shows the transport unit from FIG. 5 in a third operating state.

FIG. 7 illustrates a further option for arrangement of the transport containers 10 on the transport unit 12. In the example, two transport containers 10 are arranged crosswise on the transport unit 12, with the same orientation as the transport container 10 shown in FIG. 6.

Figure 8:
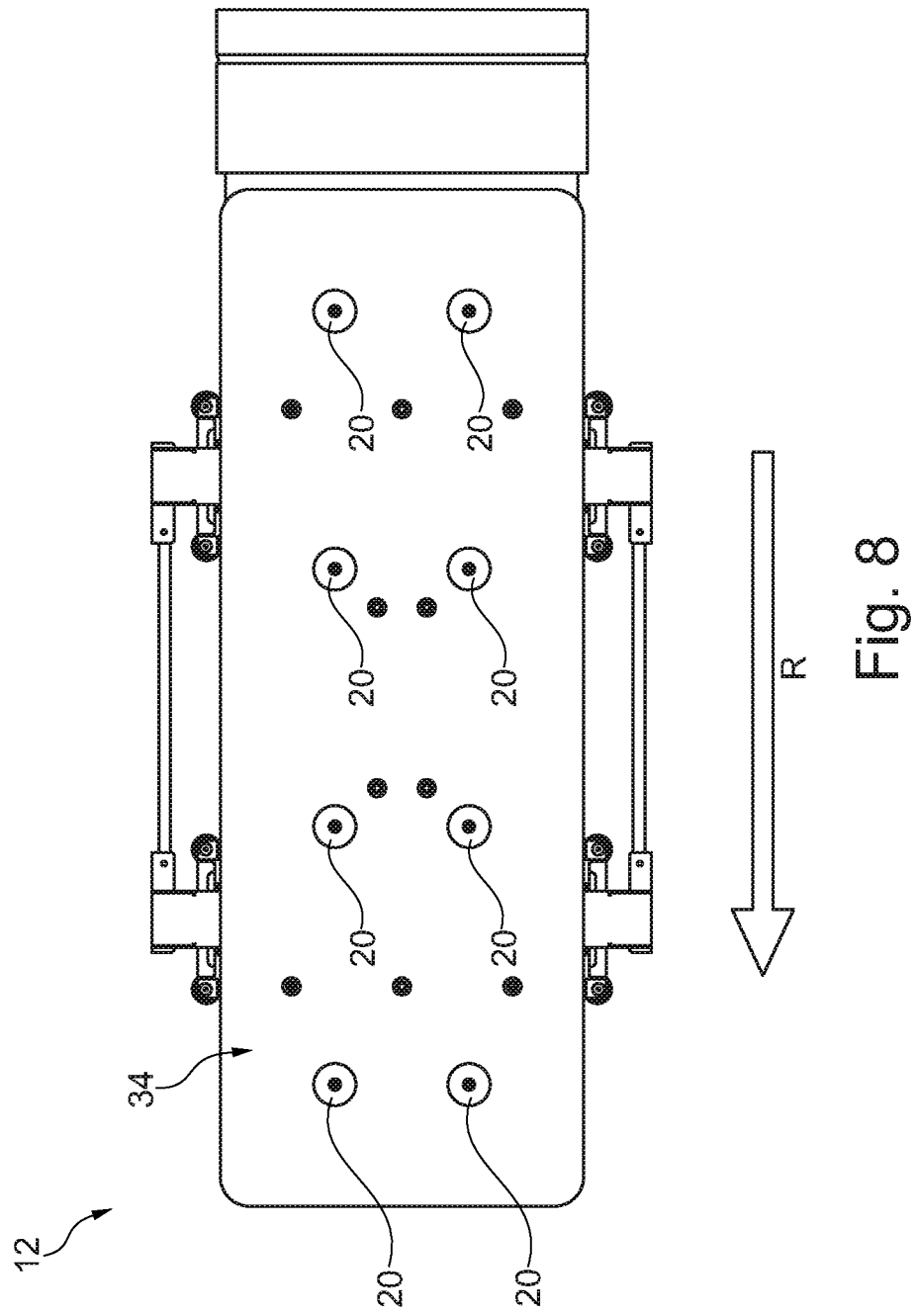
FIG. 8 shows the transport unit from FIG. 5 in a fourth operating state.

FIG. 8 shows a transport unit 12 in a state without a transport container 10. In a direction of travel R, four pairs of second retaining means 20 are arranged at equal intervals one from another on a mating surface 34. With the intervals between the pairs of retaining means being identical, it is possible for any set of four adjacent second retaining means 20 to be used when attaching a transport container 10, as represented in FIGS. 6 and 7. As a result, the transport containers can be positioned centrally, as shown in FIG. 6, or at the front and/or at the rear of the transport unit, as shown in FIG. 7.

Figure 9:
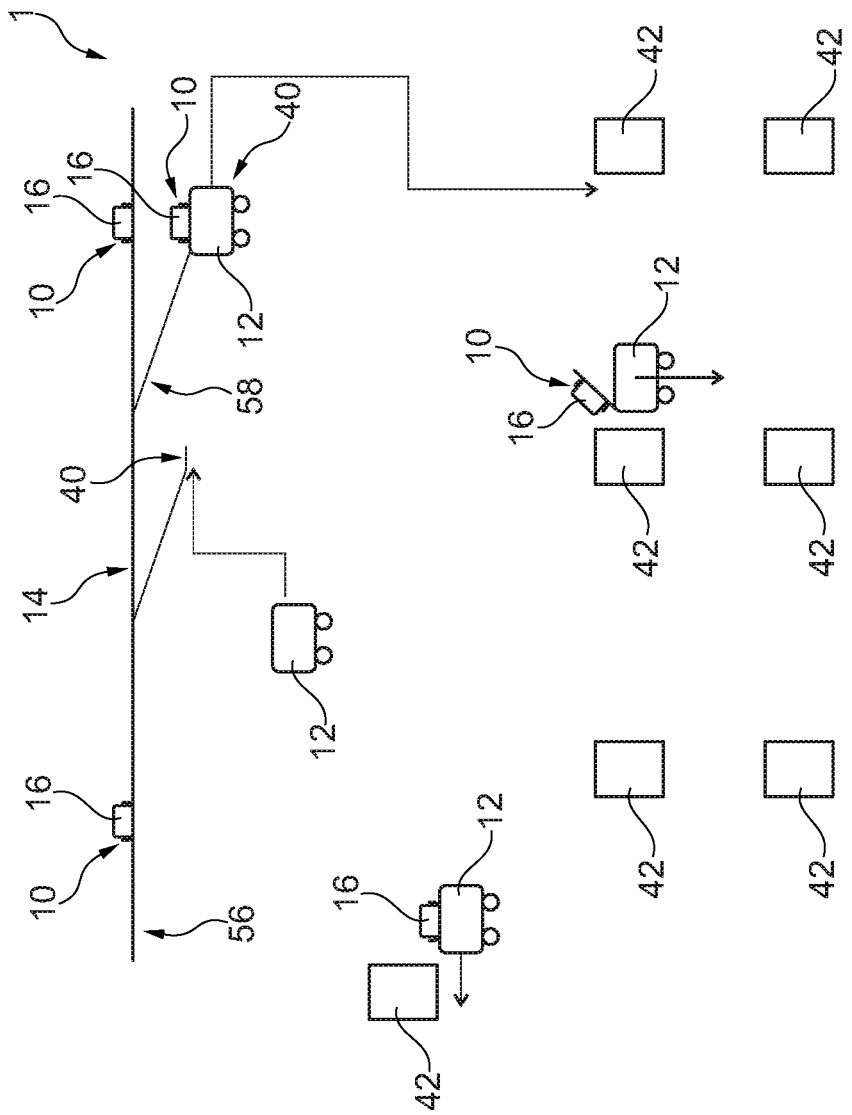
FIG. 9 shows a model representation of a conveyor system according to the invention.

FIG. 9 is a schematic representation of the conveyor system 1. On a conveyor 14, transport containers 10 capable of accommodating goods items 16 are being conveyed. In the example illustrated, the conveyor 14 has two transfer points 40, at which the transport containers 10 with goods items 16 or without goods items 16 can be transferred to transport units 12. To the right of both illustrated transfer points a transport container 10 with goods item 16 is shown at the moment of transfer to a transport unit 12. The transport unit 12, which picks up the transport container 10 and goods item 16 in this way, follows a travel route, indicated by an arrow, which is predetermined by a control device. The travel route leads to one of the discharge points 42, at which the transport unit 12 is able to tip the goods item out of the transport container 10. The process of offloading is also represented on the basis of a transport unit 12, which is situated next to a discharge point 42. There the goods item 16 is tipped out of the transport container 10. For this, use is made of an unloading device 30, already described in detail, for tipping the transport container 10. Next, the transport unit 12 continues in unladen state, that is to say without a goods item 16, in the direction of travel indicated by an arrow. The conveyor 14 may have at its disposal a main conveying route 56. From this main conveying route 56 ramps 58 may branch off, which are connected to the main conveying route 56, via a turnout system, for example. The ramps 58 lead to the transfer points 40. On transfer, the transport units 12 may travel along below the ramp, while a transport container 10 slides down the ramp until it comes to rest on the mating surface 34 of the transport unit 12 and the first retaining means 18 of the transport container 10 engage with the second retaining means 20 of the transport unit 12. In particular this is indicated at the left transfer point 40 of the conveyor 14.

Figure 10:
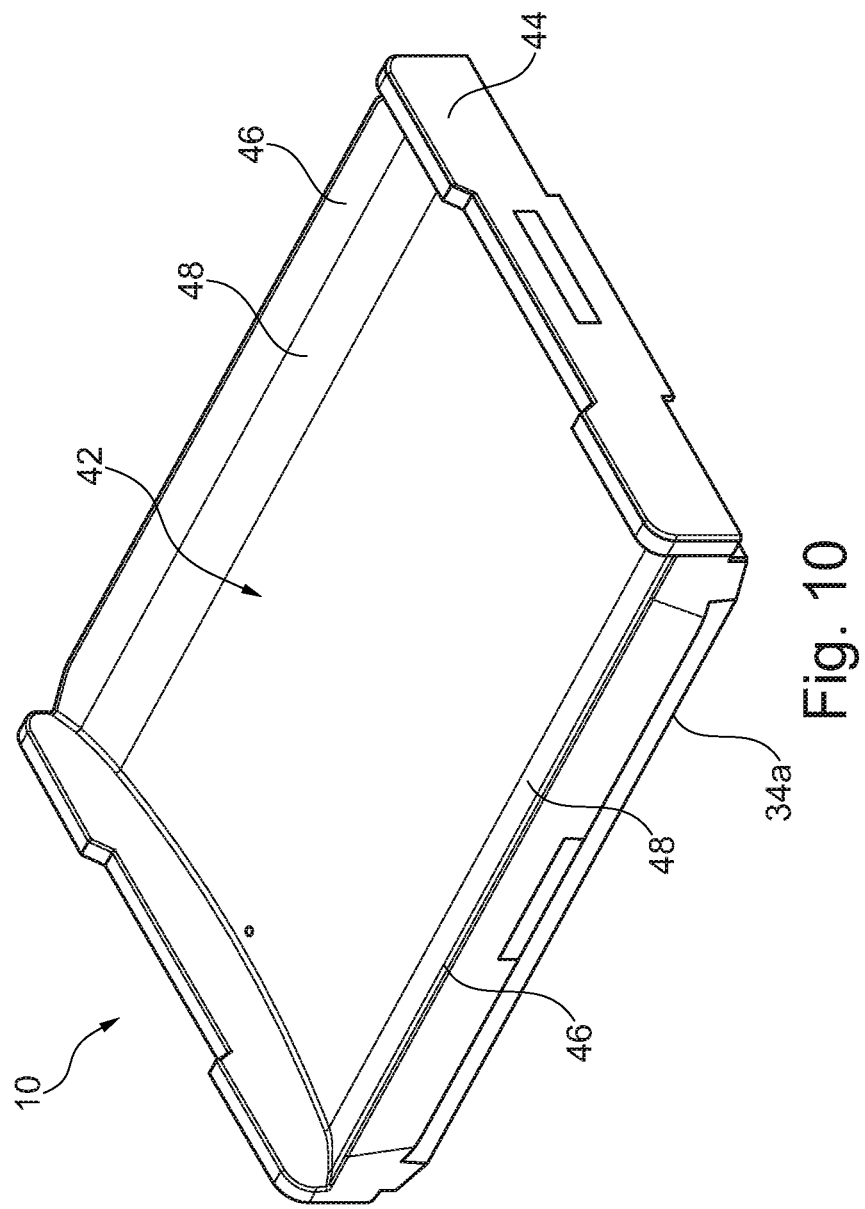
FIG. 10 shows a perspective view of a transport container.
Figure 11:
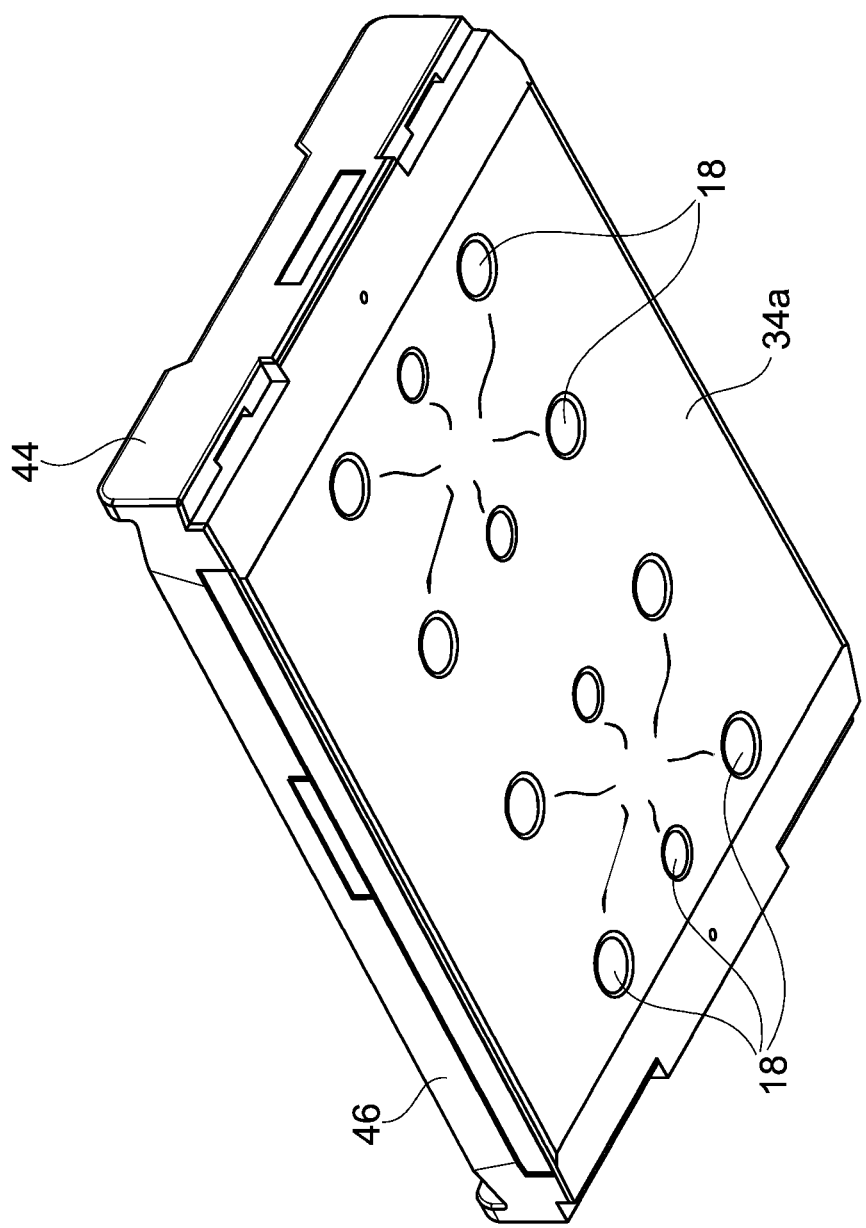
FIG. 11 shows a further perspective view of the transport container from FIG. 10.

FIG. 10 shows a preferred embodiment of a transport container 10. Here, the frame is of varying height. In the example illustrated, the frame has two high frame sections 44 and two low frame sections 46. This makes it possible to tip goods items more easily out of the transport container 10 over the lower frame sections 46. Additionally, the transport container 10 may have rounded edges or inclined surfaces 48 which also make it easier to slide the goods items 16 out of the transport containers 10. On the underside of the transport container 10 a mating surface 34a is formed, which comes to lie against the mating surface 34 of the transport unit 12, when the first retaining means 18 engage with the second retaining means 20. An example of the mating surface 34a with first retaining means 18 is shown in FIG. 11. Here, the first retaining means 18 are designed as recesses, with which second retaining means 20, designed as projections, are able to engage. The transport container represented has a bearing surface 32, which is formed as a hollow and is bounded by the frame parts 44 and 46. The hollow has in this case a slightly concave surface and becomes gradually steeper towards the sides as a result of the inclined surfaces 48.

The invention claimed is:

1. A conveyor system for the conveying of goods items, comprising at least one transport container for accommodating a goods item and a controlled, drivable and movable, driverless transport unit for accommodating and conveying a transport container;
wherein the transport unit comprises a discharge device that detachably couples the transport container to the transport unit via a retaining mechanism so that they move as a single unit along the conveyor system; and
wherein the discharge device includes a pivot or lifting element that mechanically couples and engageably operates between the transport unit and the transport container to lift and displace at least one side of the transport container from the transport unit without entirely detaching from the transport unit during a tipping operation for unloading a goods item on the transport container.

2. The conveyor system in accordance with claim 1, wherein the discharge device comprises a tipping device for tipping an accommodated transport container for the purpose of unloading goods items from the transport container, where the retaining mechanism is designed to retain the transport container on the transport unit during a tipping process, wherein the tipping device comprises a pivotable surface for supporting the transport container with one side of the surface pivotably coupled to a hinge on the transport unit and the other side being liftable and displaceable from the transport unit.

3. The conveyor system of claim 2 wherein the hinge has a tipping axis oriented in a direction of travel of the transport unit on the conveyor system so that the goods item on the transport container discharges at a right angle to the direction of travel.

4. The conveyor system in accordance with claim 1, further comprising a conveyor includes a transfer point, at which the transport container can be transferred from the driverless transport unit to the conveyor or vice-versa.

5. The conveyor system in accordance with claim 4, wherein the conveyor comprises a track system, on which the transport container is conveyable.

6. The conveyor system in accordance with claim 1, wherein the transport container has a coupling section with first retaining means and the retaining mechanism has a second retaining means for interaction with the first retaining means.

7. The conveyor system in accordance with claim 6, wherein the first retaining means are designed to engage interlockingly with the second retaining means, where the first retaining means comprise projections and the second retaining means comprise recesses corresponding to the projections, or vice-versa.

8. The conveyor system in accordance with claim 1, wherein the retaining mechanism comprises detachable clamping—or tensioning elements for interacting with the transport container, whereby the transport container is fixable to the transport unit.

9. The conveyor system in accordance with claim 1, wherein the transport container has an accommodation section, which defines an upper, object bearing surface for goods items, where the transport container is X-ray permeable.

10. The conveyor system in accordance with claim 1, wherein the transport unit has steerable rollers or wheels.

11. The conveyor system in accordance with claim 1, wherein an upper object bearing surface of the transport container is concave upward in cross-section, in order to form a hollow for accommodation of the goods item(s).

12. The conveyor system of claim 1 wherein the tipping devices comprises a hinge integral to the transport unit.

13. The conveyor system of claim 12 wherein one side of the hinge is coupled to a first side of the transport container.

14. The conveyor system of claim 13 wherein an opposite, second side of the transport container is coupled to a unilateral lifting element.

15. A procedure for operating a conveyor system in, comprising the following steps:
providing a conveyor system, comprising at least one transport container for accommodating a goods item and a controlled, drivable and movable, driverless transport unit for accommodating and conveying a transport container, wherein the transport unit comprises a discharge device that detachably couples the transport container to the transport unit via a retaining mechanism so that they move as a single unit along the conveyor system; and wherein the discharge device includes a pivot or lifting element that mechanically couples and engageably operates between the transport unit and the transport container to lift and displace at least one side of the transport container from the transport unit without entirely detaching from the transport unit during a tipping operation for unloading a goods item on the transport container;

loading of the transport container with a goods item;

picking up of the loaded transport container by a transport unit and connection of the transport unit to the transport container by means of the retaining mechanism;

conveying of the loaded transport container by the transport unit; and unloading of the goods item by means of the discharge device or by detachment of the connection between the transport container and the transport unit by means of the retaining mechanism and discharge of the transport container loaded with the goods item.

16. The procedure in accordance with claim 15, comprising the steps:

transferring of the loaded transport container to a conveyor;

conveying of the loaded transport container on the conveyor;

transferring of the loaded transport container from the conveyor to a transport unit.

17. The procedure in accordance with claim 15, further comprising the step of:

detaching of the connection between the transport container and the transport unit by means of the retaining mechanism and transfer of the loaded transport container from the transport unit to the conveyor.

18. The procedure in accordance with claim 15, further comprising the step of: taking over of the transport container, either empty or loaded with a goods item, by a transport unit from the conveyor, or transfer in a reverse direction.

19. The procedure in accordance with claim 15, wherein the step of unloading of the goods item is carried out while the transport container is connected to the transport unit, the goods item being tipped out during travel.

20. A conveyor system for the conveying of goods items, comprising at least one transport container for accommodating a goods item and a controlled, drivable and movable, driverless transport unit for accommodating and conveying a transport container;

wherein the transport unit comprises a discharge device that detachably couples the transport container to the transport unit via a retaining mechanism so that they move as a single unit along the conveyor system; and wherein the discharge device is configured for discharge of the transport container from the transport unit via a detachable connection that is controllable to selectively activate the retaining mechanism to connect the transport container with the transport unit and retain the transport container on the transport container, or to release the retaining mechanism and allow the transport container to be discharged from the transport unit.

21. The conveyor system of claim 20 wherein the discharge device is controllably configured to discharge goods items from the transport container coupled to the transport unit by selecting either a (1) an operation of the discharge device that includes a release of the retaining mechanism and thereby a discharge of the goods-laden transport container from the transport unit, or (2) an operation of the discharge device without a release and discharge of the transport container, the transport unit remaining coupled to the transport unit during the discharge operation.

* * * * *